E. Taylor,
Hay Press.
N°76,548.    Patented Apr.7, 1868.
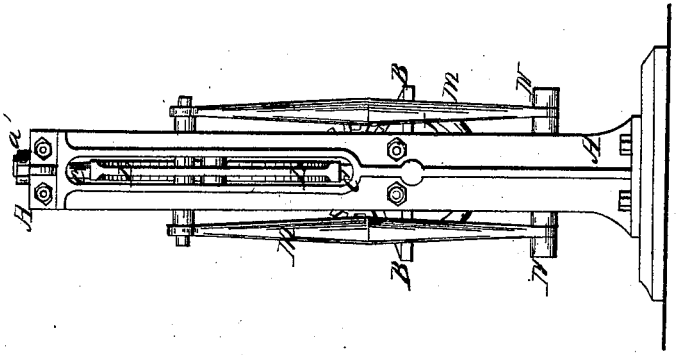
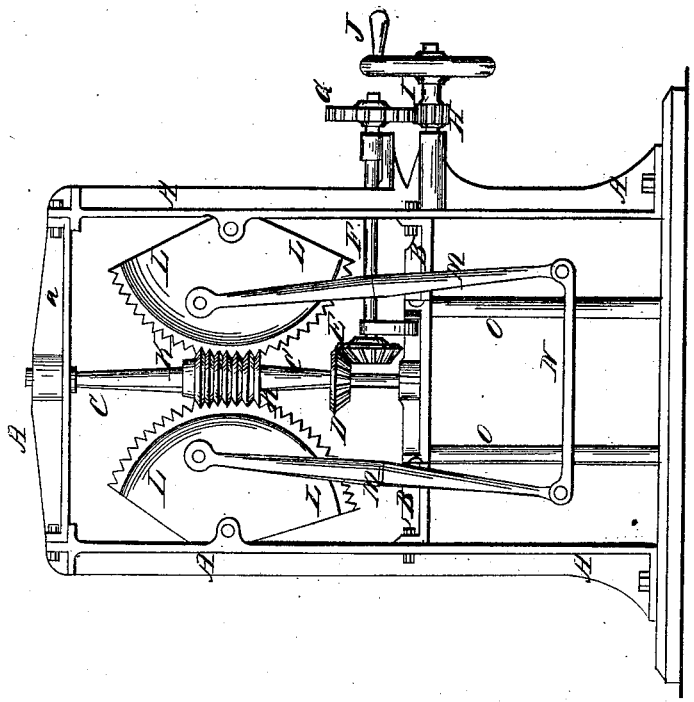
Witnesses.    Inventor.

United States Patent Office.

ENOCH TAYLOR, OF MEMPHIS, TENNESSEE.

*Letters Patent No. 76,548, dated April 7, 1868.*

---

IMPROVEMENT IN BALING-PRESSES.

---

The Schedule referred to in these Letters Patent and making part of the same.

---

TO ALL WHOM IT MAY CONCERN:

Be it known that I, ENOCH TAYLOR, of Memphis, in the county of Shelby, and State of Tennessee, have invented a new and useful Improvement in Baling-Press; and I do hereby declare that the following is a full, clear, and exact description thereof, which will enable those skilled in the art to make and use the same, reference being had to the accompanying drawings, forming part of this specification, in which—

Figure 1 is a side view of my improved press.

Figure 2 is an end view of the same.

My invention has for its object to furnish an improved press for pressing or baling cotton, hay, tobacco, &c., which shall be strong, durable, simple in construction, and effective in operation; and it consists in operating the press by means of a concave worm-screw formed upon a vertical shaft, and toothed segments of wheels, the teeth of which mesh into the threads of the said concave screw, the whole being constructed and arranged as hereinafter more fully described.

A is the frame of the machine.

B is a cross-beam securely attached to the frame A, and having a stationary platform attached to or formed upon it, said platform forming the upper side of the baling-box.

C is a vertical shaft, the lower end of which is pivoted to the cross-beam or stationary platform B, and the upper end of which revolves in bearings in the upper cross-beam $a'$ of the frame A.

To the lower part of the shaft C is attached a bevel-gear wheel, D, into the teeth of which mesh the teeth of the bevel-gear wheel E, attached to the inner end of the horizontal shaft F. The shaft F revolves in bearings attached to the framework of the machine.

To the outer end of the shaft F is attached a large gear-wheel, G, into the teeth of which mesh the teeth of the small gear-wheel H, attached to the crank-shaft I, to the outer end of which is attached the crank-wheel J, which also acts as a balance-wheel.

Upon the middle part of the vertical shaft C is formed or to it is attached a concave worm or endless screw, K, the concavity of which corresponds with the arc of the toothed segments L, the teeth of which mesh into the thread of the said concave screw K, so that the teeth of the said segments may bear upon the threads of the said screw throughout its whole length.

The toothed segments L are pivoted at the centres of the circles of which they are parts to the frame A, as shown in figs. 1 and 2, so that in whatever position the said segments may be, their teeth may still mesh into the threads of the concave worm-screw K.

To the sides of the segments L are pivoted the upper ends of the connecting-bars M, the lower ends of which are pivoted to the four corners of the movable or suspended platform N, which forms the lower side or bottom of the baling-box.

O are guide-rods which pass through holes in the platform N, to keep it in proper position while moving up and down. The lower ends of the guide-rods O are attached to the floor or foundation-frame of the machine, and their upper ends to the beam or platform B.

I claim as new, and desire to secure by Letters Patent—

The arrangement of the upper platform B, lower platform N, working upon the posts O, connecting-bars M, toothed segments L, worm K, and the gearing D E G H, and crank-wheel J, all operating as described, for the purpose specified.

ENOCH TAYLOR.

Witnesses:
HARRY C. TALMADGE,
JAS. E. LAWTON.